Patented June 5, 1945

2,377,676

UNITED STATES PATENT OFFICE 2,377,676

PREPARATION OF POWDERED METALS

Charles D. Coxe, Bridgeport, Conn., assignor to Remington Arms Company, Inc., Bridgeport, Conn., a corporation of Delaware No Drawing. Application March 19, 1942, Serial No. 435,296

10 Claims. (Cl. 75—0.5)

This invention relates to powder metallurgy, especially to the preparation of the molding powder. More particularly it appertains to the reduction of iron ore, and the precipitation of iron powder in a fused bath of water soluble material capable of dissolving the iron ore and gangue.

The successful practice of powder metallurgy, that is, the manufacture of machine parts and the like, by sintering pressure molded powdered metal units, requires, inter alia, a low cost material having a high degree of chemical purity. In addition, the particles must be of particular sizes and shapes. The required size classification or degree of fineness can be obtained by screening, although it would decrease the cost if this step could be eliminated. Up to the present time the large scale development of iron powder metallurgy has been restrained and hindered because of the other factors, primarily purity and cost. A satisfactory iron powder should not contain flaky particles, should have an analysis of about 98% Fe and .20%–.35% C., and should sell for about $40 per ton. Material of satisfactory physical characteristics and chemical properties can be produced by crushing sponge iron from hand-picked ore from high grade deposits, but the cost is many times that warranting comprehensive use. Good iron powder can also be produced by the carbonyl process, but the cost is prohibitive, being in the neighborhood of $2,000 per ton.

The primary object of this invention was to devise a simple process for producing various metal molding powders at very low cost. Other objects were to simplify iron ore reduction; to produce iron and iron alloy molding powders by the reduction of ores, sludges and the like dissolved in water soluble fluxes; to produce various metals by reduction of various metal oxides dissolved in fused borax; to reduce iron oxides in molten borax below the sintering temperature of iron and its alloys; and to prepare iron powders suitable for pressure molding by precipitation from fused salt solutions of ferric oxide and related ores by means of reducing agents. A more specific object was to form an iron molding powder by adding an alkali metal cyanide to a fused borax solution of crude iron oxide. A similar and further object was to prepare finely divided iron suitable for powder metallurgy by magnetically separating the precipitate obtained by passing fuel gas through a liquid solution of iron oxide in a fused bath comprising essentially borax, alkali metal chloride and alkali metal carbonate. Yet further objects were to reduce iron oxide and convert the gangue accompanying it and its ores to water soluble material in one operation; to form an aqueous solution of the water solubilized gangue of an iron ore, from which the gangue could be precipitated and separated from the solubilized material; and to enable the material converting the gangue to a water soluble product to be reclaimed for reuse.

It has now been found that a satisfactory iron molding powder can be prepared by dissolving iron ore in a fused water soluble material such as borax; reducing the iron compound to metallic iron by adding a carbon containing reducing agent such as sodium cyanide or illuminating gas to the fused bath while maintaining it below the sintering temperature of iron; cooling the reaction mass; leaching out the water solubilized gangue with an aqueous solvent; magnetically separating the sediment; precipitating the silicates and related gangue materials in the leaching liquor by the addition of an alkaline earth compound, for example calcium oxide (lime); filtering off the precipitate; and recovering the fluxing material by evaporating the filtrate to dryness.

How the foregoing objects and related ends are accomplished will be apparent from the following exposition, in which are disclosed the principle and divers embodiments of the invention, including the best mode contemplated for carrying out the same. Parts are given by weight throughout the application unless otherwise specified.

Example I

Mix iron ore ($Fe_2O_3$) with twice its weight of anhydrous borax, and fuse in a nickel crucible. A bright red heat will give sufficient fluidity. Add slowly to the fusion sodium cyanide until effervescence ceases. Cool the resultant mass, crush and leach with water. Pass the sediment through a magnetic separator. The recovered iron powder will have a high degree of purity.

Example II

Mix 10 parts of crude ferric oxide with 30 parts of anhydrous borax and melt the mixture. Introduce sodium cyanide granules into the melt so long as an effervescence of combustible gases is discernible. Allow the melt to cool, and crush it. Dissolve away the flux and magnetically separate the remaining solid material. A coarse iron powder will be obtained.

Example III

Mix 50 parts of crude ferric oxide ($Fe_2O_3$) with 100 parts of borax, and fuse in an iron container provided with means (suitable piping) for introducing a gas below the surface of the melt, and means (exit piping) to permit the escape of gas from the space above the melt. While maintaining a temperature of 981° C. (1800° F.), run carbureted water gas (approximately 550 B. t. u.) through the melt until the iron oxide has been reduced to iron. Cool, crush and leach the fusion with water. Pass the sediment through a magnetic separator to recover the finely divided iron powder.

*Example IV*

Mix 50 parts of crude ferric oxide ($Fe_2O_3$) with 125 parts of borax, and fuse in an iron container provided with means (suitable piping) for introducing a gas below the surface of the melt, and means (exit piping) to permit the escape of gas from the space above the melt. While maintaining a temperature of 981° C. (1800° F.), run natural gas (largely methane) through the melt until the iron oxide has been reduced to iron. Cool, crush and leach the fusion with water. Pass the sediment through a magnetic separator to recover the finely divided iron powder. If the reduction is not complete there will be a corresponding proportion of magnetic iron oxide ($Fe_3O_4$).

*Example V*

Mix 100 parts of crude ferric oxide with 50 parts of borax, 50 parts sodium chloride and 180 parts sodium carbonate (commercial grade soda ash), and fuse in an iron container of the type described in Example III. While maintaining a temperature of 981° C. (1800° F.), run carbureted water gas (approximately 550 B. t. u.) through the melt until the iron oxide has been reduced to iron. After cooling, crush the reaction mass and dissolve away the soluble portions with water. Pass the sediment through a magnetic separator to recover the very pure iron powder resulting.

*Example VI*

Mix 95 parts of crude ferric oxide ($Fe_2O_3$) with 50 parts of borax, 50 parts sodium chloride and 180 parts sodium carbonate, place in a claybonded graphite crucible, and fuse in an iron container. While maintaining a temperature of 981° C. (1800° F.) pass ordinary city illuminating and heating gas (approximately 550 B. t. u.) through the fusion. The flux will attack the clay bond, dissolving it, but the graphite shell will remain intact and act as a filter. The flux mixture will seep out of the crucible, leaving the reduced iron powder in a crumbly lump bonded by some of the residual flux. Upon washing with water, iron powder, substantially free from oxide, will be obtained.

*Example VII*

Mix 100 parts crude ferric oxide ($Fe_2O_3$) with 50 parts nickel oxide (crude), 50 parts of borax and 180 parts sodium carbonate, and fuse in an iron container. Pass carbureted water gas through the fusion at 981° C. (1800° F.) until the reduction of the oxides is complete. Crush the cooled melt, and leach out the flux with water. A very satisfactory powder containing iron and nickel will be obtained.

*Example VIII*

Mix 100 parts crude ferric oxide ($Fe_2O_3$) containing a considerable amount of silica compounds, with 50 parts of borax, 50 parts sodium chloride and 180 parts commercial soda ash, and fuse in an iron container. Pass carbureted water gas through the fusion at 981° C. (1800° F.) until the reduction to iron is complete. Crush the cooled melt and leach out the flux with water. Pass the sediment through a magnetic separator. A high grade iron molding powder will be obtained.

Treat the leached flux with lime. The soluble silicates deriving from the gangue ($SiO_2$) in the iron ore will precipitate as insoluble calcium silicate. Filter and evaporate the filtrate to recover the flux for use in a subsequent fusion.

In perspective, a preferred embodiment of the invention comprises:

1. Fusing the flux and ore in a closed retort and bring the temperature to 981° C. (1800° F.).
2. Passing a reducing gas through the fluid for about two hours (or adding a solid reducing material such as sodium cyanide to the liquid until effervescence ceases).
3. If desired, adding more iron ore and more reducing material until the retort is full.
4. Cooling, dumping the retort, and breaking up the resultant cake.
5. Wetting the cake and crushing it.
6. Digesting the crushed material in hot water.
7. Separating the iron magnetically.
8. Evaporating the gangue and flux solution and separating the silicates by the addition of limestone or the like.
9. Completing the evaporation and returning the recrystallized flux to the retort.

Many of the advantages of the present invention will be apparent from consideration of the details of the process. It should be particularly noted that alloy molding powders can be prepared by a joint reduction of a plurality of metal ores. Only simple mechanical handling and cheap, readily available reagents are necessary in the present process, which produces a powder of proper physical characteristics and chemical properties directly. The hand picking of high grade ores and sponge iron type reduction steps heretofore practiced in the art are eliminated, and a free running powder obtained directly. The main ingredients of the reduction process are recoverable by simple evaporation procedures.

As many apparently widely different embodiments of this invention may be made without departing from the spirit and scope thereof, it is to be understood that this invention is not limited to the specific embodiments thereof except as defined in the appended claims.

I claim:

1. The process which comprises dissolving ferric oxide in molten borax, adding sodium cyanide to the melt below the sintering point of iron to precipitate finely divided iron and leaching the extraneous material from the resulting iron.

2. The process which comprises dissolving iron ore in molten borax, adding alkali metal cyanide to the melt below the sintering point of iron to precipitate finely divided iron, and leaching the extraneous material from the resulting iron.

3. The process which comprises dissolving a ferrous metal oxide in molten borax, adding carbon containing material to the melt below the sintering point of iron to precipitate finely divided iron, and leaching the extraneous material from the resulting iron.

4. The process which comprises dissolving iron ore in a molten bath of borax, alkali metal chloride, and alkali metal carbonate, adding an iron oxide reducing agent to the melt below the sintering point of iron to precipitate finely divided iron, and leaching the extraneous material from the resulting iron.

5. The process which comprises dissolving iron ore in a molten bath of borax, alkali metal chloride and alkali metal carbonate, adding a fuel gas to the melt below the sintering point of iron to precipitate finely divided iron, and leaching the extraneous material from the resulting iron.

6. The process which comprises dissolving iron ore in a molten bath of borax, sodium chloride and sodium metal carbonate, adding a fuel gas to the melt below the sintering point of iron to precipitate finely divided iron, and leaching the extraneous material from the resulting iron.

7. The process which comprises dissolving ferric oxide in a molten bath of borax, sodium chloride and sodium metal carbonate, adding a hydrocarbon gas to the melt below the sintering point of iron to precipitate finely divided iron, and leaching the extraneous material from the resulting iron.

8. The method of producing finely divided iron from iron oxide comprising mixing the iron oxide with a water soluble flux and fusing the iron oxide and flux, treating the fused mixture with a reducing agent at a temperature below the melting point of iron, dissolving the reduced fused mixture in water, and then separating the finely divided iron from the solution.

9. The process of preparing an iron molding powder, which comprises dissolving iron oxide in a fused water soluble material, reducing the dissolved iron oxide to metallic iron by adding a carbon containing reducing agent to the fused bath while maintaining it below the sintering temperature of iron; cooling the reaction mass; leaching out the water solubilized gangue with an aqueous solvent; and magnetically separating the sediment.

10. The process of preparing an iron molding powder, which comprises dissolving iron oxide in a fused water soluble material; reducing the dissolved iron oxide to metallic iron by adding a carbon containing reducing agent to the fused bath while maintaining it below the sintering temperature of iron; cooling the reaction mass; leaching out the water solubilized gangue with an aqueous solvent; magnetically separating the sediment; precipitating the silicates and related gangue materials in the leaching liquor by the addition of a soluble alkaline earth compound; filtering off the precipitate; and recovering the fluxing material by evaporating the filtrate to dryness.

CHARLES D. COXE.